United States Patent [19]

Gellert et al.

[11] Patent Number: 5,028,227
[45] Date of Patent: Jul. 2, 1991

[54] INJECTION MOLDING NOZZLE WITH REPLACEABLE GATE INSERT

[75] Inventors: Jobst U. Gellert, Georgetown; Robert R. Freier, Brampton; James J. Sheffield, Loretto, all of Canada

[73] Assignee: Mold-Masters Limited, Georgetown, Canada

[21] Appl. No.: 265,408

[22] Filed: Oct. 31, 1988

[51] Int. Cl.⁵ .............................................. B29C 45/20
[52] U.S. Cl. ............................... 425/190; 264/328.15; 425/549; 425/568; 425/510; 425/511
[58] Field of Search ............... 425/549, 568, 570, 571, 425/564, 191, 190; 264/328.15

[56] References Cited

U.S. PATENT DOCUMENTS

| | | | |
|---|---|---|---|
| 2,871,517 | 2/1959 | Allard | 425/549 |
| 4,043,740 | 8/1977 | Gellert | 425/566 |
| 4,266,723 | 5/1981 | Osuna-Diaz | 425/549 |
| 4,279,588 | 7/1981 | Gellert | 425/549 |
| 4,285,660 | 8/1981 | Mueller | 425/528 |
| 4,286,941 | 1/1981 | Gellert | 425/566 |
| 4,450,999 | 5/1984 | Gellert | 425/549 |
| 4,688,622 | 8/1987 | Gellert | 164/61 |
| 4,768,283 | 6/1988 | Gellert | 425/549 |
| 4,787,836 | 11/1988 | Osuna-Diaz et al. | 425/549 |

FOREIGN PATENT DOCUMENTS 529897 2/1987 Canada .
532677 3/1987 Canada .
549516 10/1987 Canada .
549520 10/1987 Canada .
559000 2/1988 Canada .

Primary Examiner—Jay H. Woo
Assistant Examiner—Timothy W. Heitbrink
Attorney, Agent, or Firm—Riches, McKenzie & Herbert

[57] ABSTRACT

A sprue gated injected molding system having nozzles with a removable hollow gate insert received in a seat in the forward end of each nozzle to form the gate. Each gage insert has a forward portion with a tapered outer surface which abuts against a matching tapered surface of an opening through to mold to the cavity. The forward portion of the gate insert is resilient which ensures extremely good contact between them under bearing pressure due to thermal expansion of the nozzle. Thus optimum uniform heat transfer is provided between the gate insert and the cooled mold. The gate insert has a circumferential removal flange to facilitate it being pryed out of the seat if replacement is required. In an alternate embodiment an elongated torpedo is seated centrally in the melt bore of each nozzle. The torpedo has an outer retaining ring and a number of radially extending tapered fins which form melt flow channels between them. The torpedo is mounted with the retaining ring secured in the seat in the forward end of the nozzle by the gate insert and a pointed tip formed by the fins extending to provide additional heat in or adjacent the gate. The torpedo has pointed tips at opposite ends and is reversible for different dimensioned applications.

6 Claims, 3 Drawing Sheets

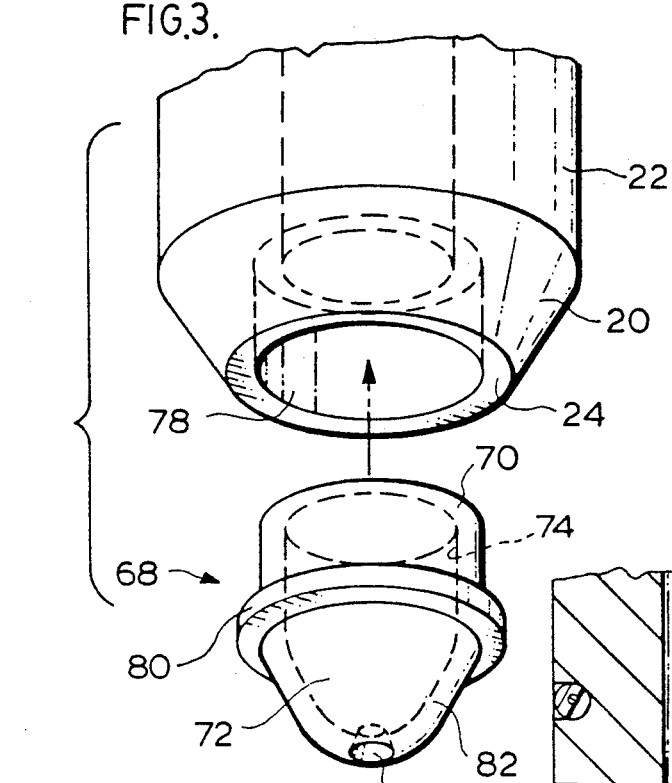
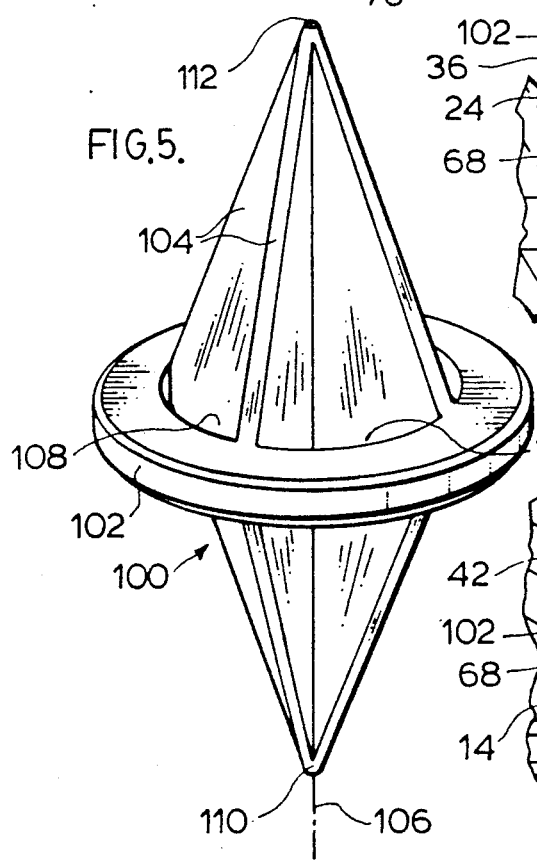
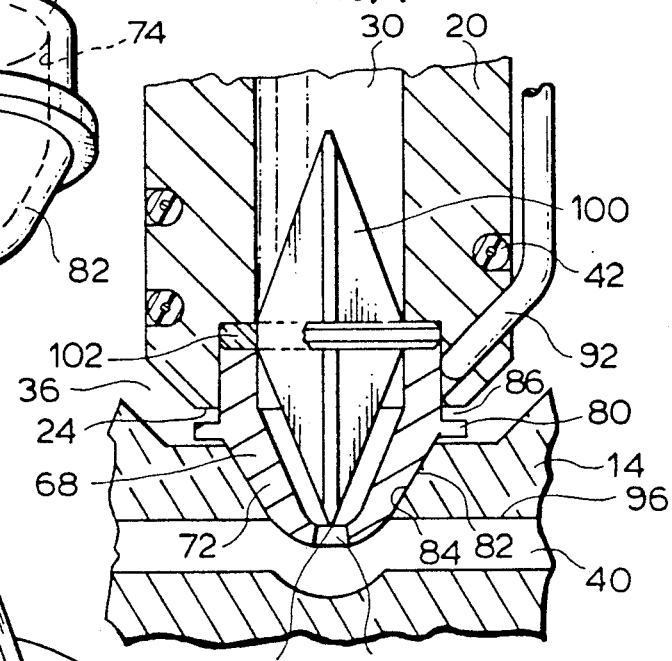

INJECTION MOLDING NOZZLE WITH REPLACEABLE GATE INSERT

BACKGROUND OF THE INVENTION

This invention relates generally to injection molding and more particularly to a sprue gated injection molding system having nozzles with an easily removable gate insert.

Gate inserts or nozzle seals are well known in the art. Early examples for use in valve gated systems are shown in U.S. Pat. No. 4,043,740 to Gellert which issued Aug. 23, 1977 and U.S. Pat. No. 4,286,941 to Gellert which issued Sept. 1, 1981. More recent examples of threaded gate inserts are shown in Gellert's Canadian patent applications serial numbers 532,677 filed Mar. 20, 1987 entitled "Injection Molding Nozzle and Method", 559,000 filed Feb. 16, 1988 entitled "Injection Molding Heated Gate Insert and Method" and the applicant's Canadian patent application serial number 549,516 filed Oct. 16, 1987 entitled "Injection Molding System Having Clamped Rotatable Nozzles and Method". Gate inserts in combination with heat conductive torpedoes are also known as shown in U.S. Pat. No. 4,279,588 to Gellert which issued July 21, 1981, U.S. Pat. No. 4,266,723 to Osuna-Diaz which issued May 12, 1981, U.S. Pat. No. 4,450,999 to Gellert which issued May 29, 1984 and the applicant's Canadian patent application serial number 529,897 filed Feb. 17, 1987 entitled "Injection Molding System having Manifold with Side Mounted Nozzles and Method". While these previous gate inserts function very well for many applications, the continual development of difficult to mold materials has made heat transfer in the area of the gate even more critical to successful operation of the system. More specifically, it is very desirable in this situation that there be optimum uniform heat flow between the gate insert and the surrounding cooled mold. While the area of surface contact between them can be varied somewhat by the moldmaker depending upon the application, this is not sufficient if there is not good contact between them. Non-uniform contact between them prevents the system being designed to accurately provide the correct amount of cooling for the particular application. Furthermore, due to deterioration of the gate insert as a result of corrosion and abrasion it is desirable that it be easily removable. Bearing contact between a resilient forward portion of the gate insert and the surrounding mold provides improved more uniform conductivity between them while providing a removal flange facilitates removal of the gate insert simplifies manufacture of the gate insert.

SUMMARY OF THE INVENTION

Accordingly, it is an object of the invention to at least partially overcome the problems of the prior art by providing a system having nozzles with removable gate inserts which are held in place by bearing contact between a resilient forward portion of each gate insert and the mold each gate insert having removal means to facilitate it being drawn out of its seat in the nozzle.

To this end, in one of its aspects, the invention provides a sprue gated injection molding system comprising an electrically heated elongated nozzle seated in a well in a cooled mold the nozzle having a rear end, a forward end and a generally cylindrical body portion with an outer surface which is separated from the surrounding mold by an insulative air space, the nozzle having a central melt bore which extends from the rear end to the forward end in alignment with an opening through the mold leading to a cavity, and a gate insert received in a seat in the forward end of the nozzle and projecting forwardly across the insulative air space into the opening leading to the cavity the gate insert having an outer surface and a central bore which is in alignment with the central melt bore of the nozzle, the gate insert having a forward portion with an inwardly tapered outer surface and a central gate therethrough, the central bore tapering inward in the forward portion to the central gate leading to the cavity, with the improvement wherein the gate insert is removably seated in the forward end of the nozzle with the opening through the mold having an inner surface which tapers forwardly inward to match the tapered outer surface of the forward portion of the gate insert, the forward portion of the gate insert being slightly resilient and being seated in the opening through the mold whereby bearing contact between the tapered inner surface of the opening and the matching tapered outer surface of the forward portion of the gate insert provides optimum uniform thermal conductivity therebetween, the outer surface of the gate insert having removal means which project outwardly into the air space between the outer surface of the gate insert and the surrounding mold to facilitate removal of the gate insert from the nozzle.

Further objects and advantages of the invention will appear from the following description, taken together with the accompanying drawings.

BRIEF DESCRIPTION OF THE DRAWINGS

FIG. 3 is an isometric view showing the gate insert removed from the nozzle

FIG. 4 is a sectional view of a portion of a similar system including a conductive torpedo seated in the nozzle according to another embodiment of the invention;

FIG. 5 is an isometric view of the torpedo seen in FIG. 4, and

FIG. 6 is a sectional view of a portion of a system having a different gate configuration according to a further embodiment of the invention.

DETAILED DESCRIPTION OF THE DRAWINGS

Figure 1:
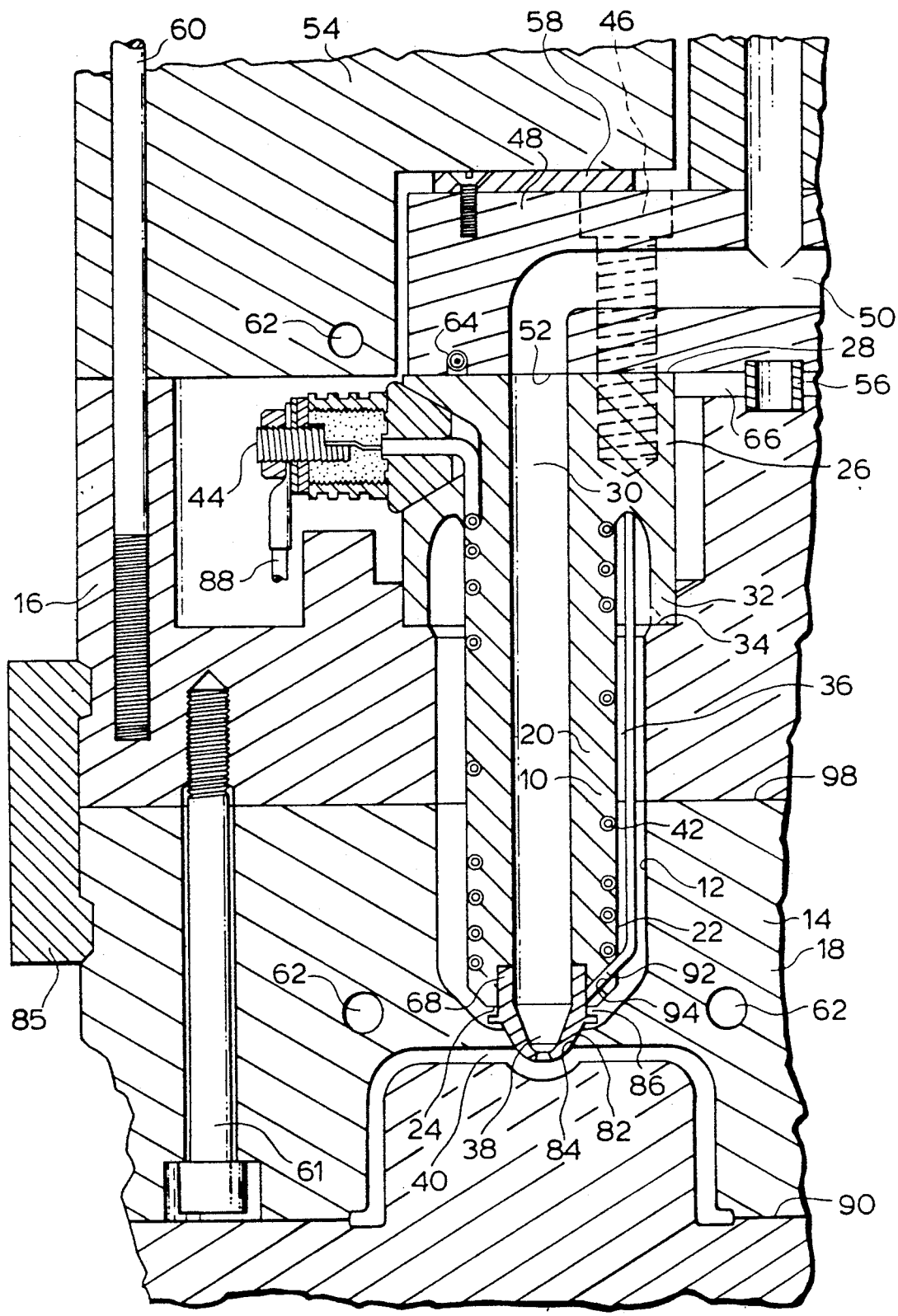
FIG. 1 is a sectional view of a portion of an injection molding system showing a nozzle with a gate insert according to a preferred embodiment of the invention.
Figure 2:
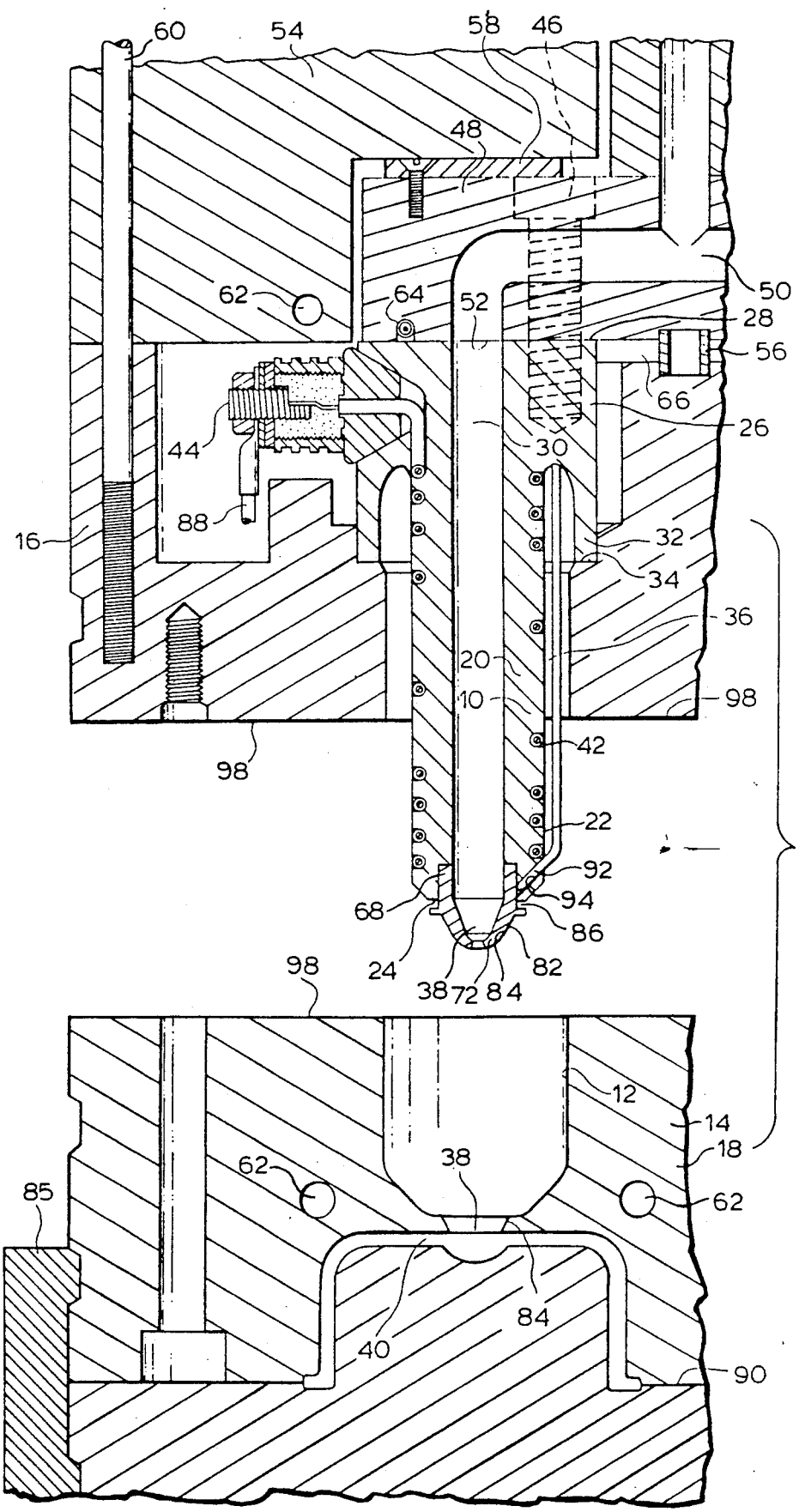
FIG. 2 is a similar view showing the mold open for removal of the gate insert.

Reference is first made to FIGS. 1 and 2 which shows a portion of a sprue gated injection molding system having a number of heated nozzles 10, each of which is seated in a well 12 in the mold 14. As described in more detail below, the mold 14 includes a support plate 16 and a cavity plate 18 which are releasably assembled together.

Each nozzle 10 has a steel body portion 20 with a generally cylindrical outer surface 22 extending to the forward end 24 from a steel collar portion 26 adjacent the rear end 28. The elongated nozzle 10 has a central melt bore 30 which extends from the rear end 28 to the forward end 24. The nozzle 10 is seated in the well 12 by a circumferential insulation flange or bushing 32 which extends from the collar portion 26 and sits on a circumferential shoulder 34. In this position, the cylindrical outer surface 22 of the body portion 20 is separated from the surrounding mold 14 by an insulative air space 36, and the central melt bore 30 is in alignment with a central opening 38 through the cavity plate 18 leading to a cavity 40.

Each nozzle is heated by an electrically insulated heating element 42 which is integrally brazed in a spiral channel in the body portion and extends to terminal 44 which projects outward from the collar portion 26 as described in detail in the applicant's Canadian patent application serial number 549,520 filed Oct. 16, 1987 entitled "Method of Manufacture of Injection Molding Nozzle Electrical Terminal". The heating element 42 in the channel is covered by a protective nickel coating which is applied as described in U.S. Pat. No. 4,768,283 to Gellert which issued Sept. 6, 1988.

The nozzles 10 are secured by bolts 46 to a common elongated manifold 48 which has a melt passage 50 which branches to a number of outlets 52, each of which is aligned with the melt bore 30 through one of the nozzles 10. The manifold 48 is held securely in place between a back plate 54 and the support plate 16 by a central locating ring 56 and a titanium pressure pad 58. The back plate 54 is held in place by bolts 60 which extend into the support plate 16. The cavity plate is secured in place by bolts 61 which extend into the support plate 16. The back plate 54 and the cavity plate 18 are cooled by pumping cooling water through cooling conduits 62. The manifold 48 is heated by an electric heating element 64 which is cast into it as described in the applicant's U.S. Pat. No. 4,688,622 entitled "Injection Molding Manifold Member and Method of Manufacture" which issued Aug. 25, 1987. The locating ring 56 provides another insulative air space 66 between the heated manifold 48 and the support plate 16.

Reference is now also made to FIG. 2 in describing a gate insert 68 according to a preferred embodiment of the invention. As shown, the gate insert 68 has a cylindrical rear portion 70 and an inwardly tapered forward portion 72. The gate insert 68 has a central bore 74 which tapers inwardly through the forward portion 72 to a central gate 76 which extends the gate insert 68 to the cavity 18. As can be seen, in this embodiment the gate 76 tapers outwardly as it extends through the gate insert 68. The rear portion 70 of the gate insert 68 is received in a seat 78 in the forward end 24 of the nozzle 10 and the gate insert 68 has a circumferential removal flange 80 that projects outwardly into the air space 36. The forward portion 72 has a tapered outer surface 82 which matches the inwardly tapered inner surface 84 of the opening 38 through the cavity plate 40 in which it is received. The gate insert 68 is made of H13 steel and the inwardly tapered forward portion 72 is somewhat resilient under the considerable bearing pressure between its tapered outer surface 82 and the tapered inner surface 84 of the opening 38. This provides optimum uniform thermal conductivity between the gate insert 68 and the cooled cavity plate 18. If unacceptable wear due to corrosion or abrasion from the melt or other problems with the gate insert occur it may be easily removed. First the mold is opened to the position shown in FIG. 2. The clamps 85 are moved from the position shown in FIG. 1 to the position shown in FIG. 2 to hold the mold closed along the parting line 90. Then the bolts 61 are removed and the mold is opened along line 98 to expose the forward portion 72 of the gate insert 68. Then the gate insert 68 is withdrawn from the seat 78 by prying with screwdrivers or other suitable tools in the space 86 between the forward end 24 of the nozzle 10 and the removal flange 80. While a continuous removal flange 80 is shown in this embodiment, other suitable outward projections may be provided.

In use, the system is assembled as shown in FIG. 1 and electrical power is applied through a lead 88 to the terminal 44 of the heating element 42 of each nozzle 10 and to the heating element 64 in the manifold 48 to heat the nozzles 10 and the manifold 48 to a predetermined operating temperature. This causes thermal expansion of the nozzles which forces the tapered outer surface 82 of the forward portion 72 of each gate insert 68 tightly against the matching tapered inner surface 84 of the opening 38 through the cavity plate. This may result in the resilient forward portion 72 of the gate insert 68 flexing slightly to compensate for any imperfections in the match between the two tapered surfaces 82,84. Thus, in addition to sealing against the leakage of pressurized melt into the insulative air space 36, this arrangement ensures optimum uniform heat transfer between the gate insert 68 and the cooled cavity plate 18. Pressurized melt from a molding machine (not shown) is introduced into the melt passage 50 through the manifold 48 according to a predetermined cycle in a conventional manner. The pressurized melt flows through the melt bore 30 in each nozzle, through the central bore 74 of each gate insert 68, through the gate 76 provided by each gate insert 68 and fills the cavities 40. After the cavities 40 are filled, injection pressure is held momentarily to pack and then released. After a short cooling period, the mold is opened along the parting line 90 to eject the molded products. After ejection the mold is closed and injection pressure is reapplied to refill the cavities 40. This cycle is repeated continuously with a frequency dependent on the size and shape of the cavities and the type of material being molded. A thermocouple 92 extends through the air space 36 and into a hole 94 adjacent the forward end 24 of the nozzle to monitor the operating temperature. The cavity configuration shown in FIG. 1 which is normally used for amorphous material has the forward portion 72 of the gate insert 68 with the gate 76 projecting slightly into the cavity 40. This arrangement forms a product with an indent or dimple which ensures the gate mark does not extend outward past the flat plane 96 of the product.

When the gate 76 through the gate insert 68 becomes worn or other problems arise, the gate insert 68 can be easily removed and replaced As seen in FIG. 2, the mold is clamped closed along the parting line 90, but is open along line 98 to separate the cavity plate 18 from the support plate 16. This exposes the forward portion 72 of the gate insert 68 which can then be easily withdrawn from the seat 78 by prying with screwdrivers or other suitable tools in the space 86 between the forward end 24 of the nozzle and the removal flange 80.

Reference is now made to FIGS. 3 and 4 which show an elongated torpedo 100 mounted in the melt bore 30 of the nozzle 10. The torpedo is made of high speed steel or other suitable material which is sufficiently thermally conductive and wear and corrosion resistant. The torpedo 100 has an outer retaining ring 102 which has an inner diameter equal to the diameter of the melt bore 30 through the nozzle 10 and the bore 74 through the rear portion 70 of the gate insert 68. Spaced tapered fins 104 which extend outwardly from a central axis 106 to join the outer retaining ring 102 form melt flow channels 108 between them. The tapered fins 104 extend to form pointed tips 110,112 on the central axis 106 at opposite ends of the torpedo.

In use, the torpedo 100 is securely and accurately mounted in place by the outer retaining ring 102 being received in the seat 78 in forward end 24 of the nozzles 10 and securely held there by the gate insert 68. In this position, the central axis 106 of the torpedo extends centrally in the melt bore 30 and the forward tip 110 of the torpedo extends to a predetermined precise central position in or adjacent the gate 76. During the molding cycle described above, the melt flows through the channels 108 between the fins 104 and past the forward tip 110 into the gate 76. The torpedo 100 is used when it is desirable to conduct additional heat from upstream to the forward tip 110 or adjacent the gate 76. The exact position of the forward tip 110 is determined depending upon the gate configuration, the product being made and the type of material being molded and the torpedo is dimensioned accordingly. While this type of arrangement with a tip extending adjacent the gate can be referred to as hot tip gating, for the purpose of this application it is also included within the generic term of sprue gating.

In order to provide for two different arrangements, such as shown in FIGS. 3 and 5, the torpedo 100 is made with the fins 104 sloping at different angles in opposite directions from the retaining ring 102. Thus, the tips 110,112 extend a different distance from the retaining ring 102 and the torpedo is reverseable to provide for a situation where a different dimension is required. As can be seen, in the embodiment shown in FIG. 5 the forward portion 72 of the gate insert 68 and the gate 76 have a different configuration wherein the front face 114 of the gate insert 68 is flush with the adjacent plane 96 of the cavity 40. This arrangement or configuration is normally used for crystaline materials where a very thin gate mark is obtained. While the distance from the forward tip 112 of the torpedo to the retaining ring 102 is less than in the arrangement shown in FIG. 3, the same torpedo can be used merely by reversing it end for end.

While the description of the system having matching tapered surfaces, a removal flange and torpedo have been given with respect to several embodiments of the invention, it is not to be construed in a limiting sense. Variations and modifications will occur to those skilled in the art. For instance it is apparent the gate insert 68 and matching cavity plate 18 can have different shapes and that the torpedo 100 can have a different number and shape of fins 104. Reference is made to the appended claims for a definition of the invention.

What we claim is:

1. In a sprue gated injection molding system comprising an electrically heated elongated nozzle seated in a well in an adjacent cooled mold the nozzle having a rear end, a forward end and a generally cylindrical body portion with an outer surface which is separated from the adjacent mold by an insulative air space, the nozzle having a central melt bore which extends from the rear end to the forward end in alignment with an opening through the mold leading to a cavity, and a gate insert received in a seat in the forward end of the nozzle and projecting forwardly across the insulative air space into the opening leading to the cavity, the gate insert having an outer surface, and a central bore which is in alignment with the central melt bore of the nozzle, the gate insert having a forward portion with an inwardly tapered outer surface and a central gate therethrough, the central bore tapering inward in the forward portion to the central gate leading to the cavity, the improvement wherein: the outer surface of the forward portion of the gate insert is tapered inwardly and has a first portion surrounding the central gate extending therethrough and a second portion surrounding the first portion, the gate insert is removably seated in the forward end of the nozzle with the opening through the mold having an inner surface which tapers forwardly inward to match the second portion of the tapered outer surface of the forward portion of the gate insert, the forward portion of the gate insert being slightly resilient and being seated in the opening through the mold whereby the first portion of the outer surface extends through the opening in the mold to the cavity and the second portion of the outer surface is in bearing contact against the tapered inner surface of the opening to provide optimum uniform thermal conductivity therebetween, the outer surface of the gate insert having flange means which project outwardly into the air space between the outer surface of the nozzle and the adjacent mold to facilitate removal of the gate insert from the nozzle.

2. An injection molding system as claimed in claim 1 wherein the central gate through the gate insert tapers forwardly outward.

3. An injection molding system as claimed in claim 1 wherein the gate insert is made of steel.

4. An injection molding system as claimed in claim 1 wherein the forward portion of the gate insert extends through the opening in the mold and projects into the cavity to form an indent in the product molded in the cavity.

5. An injection molding system as claimed in claim 2 wherein an elongated torpedo is mounted in the melt bore of the nozzle, the torpedo having an outer retaining ring and a plurality of spaced fins which extend radially outwardly from a central axis to the outer retaining ring to form a plurality of melt flow channels therebetween, the fins being tapered inwardly from the retaining ring to provide pointed tips at opposite ends of the torpedo, the retaining ring being received in the seat in the forward end of the nozzle and securely retained in place by the gate insert wherein the central axis of the torpedo extends centrally in the melt bore and a forward one of the pointed tips of the torpedo extends to a predetermined precise central position in or adjacent the gate formed by the gate insert.

6. An injection molding system as claimed in claim 5 wherein the fins are tapered at different angles in opposite directions from the retaining ring whereby the torpedo is reversible to have the forward tip extend a different distance from the retaining ring to provide for a different gate or gate insert configuration.

* * * * *